US005840391A

United States Patent [19]

Eichhorn et al.

[11] Patent Number: 5,840,391

[45] Date of Patent: Nov. 24, 1998

[54] DECORATIVE GLASS SHEET WITH SIMULATED BEVELED PANE AND METHOD FOR FORMING THE SAME

[75] Inventors: Keith L. Eichhorn, High Point; Lars Richter, Trinity, both of N.C.

[73] Assignee: Glass Unlimited of High Point, Inc., High Point, N.C.

[21] Appl. No.: 951,096

[22] Filed: Oct. 15, 1997

[51] Int. Cl.$^{6}$ .............................. B44C 5/08; C03C 27/02

[52] U.S. Cl. ................................ 428/38; 65/44; 65/59.4; 65/61; 428/46; 428/433; 428/542.2; 428/549; 428/630; 428/643; 428/645; 428/646; 428/687

[58] Field of Search ............................... 428/38, 46, 433, 428/542.2, 594, 630, 643, 645, 646, 687; 65/44, 59.4, 61

[56] References Cited

U.S. PATENT DOCUMENTS

| | | | |
|---|---|---|---|
| D. 184,141 | 12/1958 | Mook | D33/9 |
| D. 276,188 | 10/1984 | Metzner | D28/25 |
| D. 285,505 | 9/1986 | Billiet | D6/300 |
| 311,014 | 1/1885 | Koskul | 428/56 |
| 340,485 | 4/1886 | Caspar | 428/38 |
| 773,306 | 10/1904 | Wadsworth | 428/67 |
| 1,785,401 | 12/1930 | Zuckerberg | 428/167 |
| 4,127,689 | 11/1978 | Holt | 428/38 |
| 4,129,671 | 12/1978 | Greenberg | 428/48 |
| 4,312,688 | 1/1982 | Brodis etal. | 156/63 |
| 4,335,170 | 6/1982 | Butler | 428/38 |
| 4,438,165 | 3/1984 | Butler | 428/38 |
| 4,488,919 | 12/1984 | Butler | 156/53 |
| 4,495,739 | 1/1985 | Drennan | 52/308 |
| 4,518,446 | 5/1985 | Drennan | 156/63 |
| 4,619,850 | 10/1986 | Charlton | 428/38 |
| 4,813,990 | 3/1989 | Thorn | 65/105 |
| 4,814,213 | 3/1989 | Thorn | 428/34 |
| 4,904,513 | 2/1990 | De Nicolo | 428/46 |
| 4,989,384 | 2/1991 | Kinghorn et al. | 52/456 |
| 5,077,950 | 1/1992 | Bretches et al. | 52/546 |
| 5,098,760 | 3/1992 | Fletcher | 428/46 |
| 5,134,004 | 7/1992 | Moline | 428/38 |
| 5,267,421 | 12/1993 | Salisbury | 52/314 |
| 5,558,827 | 9/1996 | Howes | 264/220 |

FOREIGN PATENT DOCUMENTS 2132675 12/1993 United Kingdom .

OTHER PUBLICATIONS

Simpson International Doors Advertisement, Sweets Catalog File; 1982

*Primary Examiner*—Peter Chin
*Assistant Examiner*—Sean Vincent
*Attorney, Agent, or Firm*—Rhodes, Coats & Bennett, L.L.P.

[57] ABSTRACT

A decorative glass sheet simulating a multi-pane, camed window or door, and a method for forming the same. The decorative glass sheet includes a glass panel having an outer surface. At least one groove is formed through the outer surface and into the glass panel. Each groove includes a first wall extending from a first peripheral edge to a groove bottom apex and a second wall extending from the apex to a second peripheral edge. The second wall has a width greater than a width of the first wall. At least one decorative caming strip is adhered to the outer surface of the glass panel and is disposed adjacent and along the first peripheral edge of the at least one groove.

40 Claims, 5 Drawing Sheets

DECORATIVE GLASS SHEET WITH SIMULATED BEVELED PANE AND METHOD FOR FORMING THE SAME

FIELD OF THE INVENTION

The present invention is directed to a decorative glass sheet of the type used for architectural applications and a method for forming the same, and, more particularly, to a decorative glass sheet having one or more simulated beveled panes and a method for forming the same.

BACKGROUND OF THE INVENTION

In recent years, the interior and exterior design of buildings and structures, as well as the furnishings therefor, have employed increasing quantities of decorative glass. For example, it is now commonplace for glass sheets to be used in various types of doors such as shower doors, storm doors, patio doors, entry doors, bi-fold doors, and in decorative windows, mirrors, and other furniture and architectural applications. As the scope of architectural and design tastes expands, the industry has become increasingly receptive to glass sheet products which have unique visual effects.

One particularly popular glass sheet design simulates traditional brass camed doors and windows. True camed, leaded windows consist of a plurality or discrete panels joined by caming and are typically cost prohibitive and insufficiently weatherproof. In simulated camed windows, rather than having a plurality of panes joined by brass caming, the decorative glass sheets typically have a single glass sheet onto which a network of brass strips are secured. The brass strips may be straight and/or bent into various arcs. Commonly, the brass strips are adhered to the glass surface without any grooves being formed in the glass (see, for example, U.S. Pat. No. 4,619,850 to Charlton). Alternatively, it is known to form grooves in the glass surface in a pattern corresponding to a desired earning pattern and to lay the earning into the grooves so that the earning is inset in the glass (see, for example, U.S. Pat. No. 4,488,919 to Butler).

It is also known to form decorative glass sheets with brass caming adhered to the glass surface and to further adhere pre-cut glass pieces to the glass surface. Each glass piece has bevels about its periphery. The entire periphery of the piece is surrounded by earning. The bevels are intended to give observers the impression that the glass piece and the underlying glass are a discrete pane held in place by the earning (i.e., as in a traditional earned window or door). See, for example, U.S. Pat. No. 4,495,739 to Drennan, U.S. Pat. No. 4,518,446 to Drennan, and U.S. Pat. No. 4,904,513 to De Nicolo. However, this method suffers from several drawbacks. Because the glass piece is placed on the glass sheet surface, the glass piece is noticeably raised as compared to the remainder of the panel. As a result, the glass piece appears more as an inlaid and forwardly projecting jewel or crystal than as a pane of a traditional earned window. There may be a tendency during production or in use for air bubbles to form or become trapped between the glass piece and the glass sheet surface, substantially reducing the attractiveness of the decorative glass sheet. Depending on the adhesive used and nature of and time in service, the adhesive beneath the glass piece may become discolored, particularly if exposed to ultra-violet light. Because the glass piece typically is not tempered and is "reinforced" by the portion of the glass sheet to which it is adhered, it is unlikely that it will shatter into small pieces (if at all). Building codes require that many decorative glass sheet products be tempered such that they shatter in small enough pieces to avoid severe injury. For the above reason, decorative glass sheets incorporating pre-cut glass pieces as described likely will not break into sufficiently small pieces upon impact. The pre-cut pieces must be separately formed from, and applied to, the glass panel, thereby increasing the material and labor costs associated with the decorative glass sheet.

There exists a need for a means and method for effectively simulating beveled glass panes in a decorative glass sheet to give the appearance of a traditional multiple pane, camed glass window or door. There exists a need for such a means and method which are convenient and cost-effective.

SUMMARY OF THE INVENTION

The present invention is directed to decorative glass sheets which have specially configured grooves and caming so as to simulate a traditional multiple pane, camed glass window or door, and methods for forming the same. The decorative glass sheets provide effective and attractive simulation and are convenient and cost-effective to manufacture. Moreover, the decorative glass sheets are well-suited for meeting building requirements and for formation from relatively thin glass sheets, and may be beneficially incorporated in door or window frames.

The decorative glass sheet includes a glass panel having an outer surface. At least one groove is formed through the outer surface and into the glass panel. Each groove includes a first wall extending from a first peripheral edge to a groove bottom apex and a second wall extending from the apex to a second peripheral edge. The second wall has a width which is greater than a width of the first wall. At least one decorative caming strip is adhered to the outer surface of the glass panel and is disposed adjacent and along the first peripheral edge of the at least one groove.

In certain preferred embodiments, the decorative glass sheet includes a decorative band including a pair of opposed, parallel, spaced apart grooves. The pair of spaced apart grooves are relatively positioned such that their respective first peripheral walls are disposed adjacent one another and define a platform extending therebetween. The at least one caming strip is adhered to the platform and is disposed adjacent, between and along the first peripheral edges of the spaced apart grooves.

It has been found that the decorative, simulative effect is enhanced when certain parameters are observed. The first wall width is preferably no greater than 15 percent of the second wall width. Preferably, each second wall forms an angle with the outer surface of the glass panel of at least 2 degrees. Each first wall should form an angle with the outer surface of the glass panel of at least 45 degrees. Preferably, each groove has an overall width of from about 5 to 30 millimeters, and more preferably of 10 to 20 millimeters. The depth of each groove should not exceed 30 percent of the thickness of the glass panel. The glass sheet thickness is preferably from about 3 to 6 millimeters.

In certain preferred embodiments of a decorative glass sheet simulating a multi-pane, camed window or door, as described above, a plurality of grooves as described are formed through the outer surface and into the glass panel. The grooves intersect one another. A central portion forms a part of the outer surface and is defined by the second peripheral edges of the grooves and is surrounded thereby. A decorative region is defined by the first peripheral edges of the grooves. The decorative region has substantially the same shape as the central portion. Decorative caming strips are adhered to the outer surface of the glass panel and are disposed adjacent and along the first peripheral edges of the grooves.

In a preferred embodiment, the central portion is diamond shaped. Preferably, the decorative region is diamond shaped and has a length no greater than about 80 millimeters and a width no greater than about 50 millimeters. Solder may be provided joining respective decorative caming strips and disposed adjacent intersections of the grooves.

The present invention is further directed to a building unit incorporating a decorative glass sheet as described above. The building unit includes a frame member into which the decorative glass sheet is mounted, the frame member surrounding the decorative glass sheet. The frame member may be a door frame or a window frame.

The present invention is further directed to a method for forming a decorative glass sheet simulating a multi-pane, camed window or door. The method includes providing a glass panel having an outer surface and forming a decorative region by forming at least one groove through the outer surface and into the glass panel. Each groove includes a first wall extending from a first peripheral edge to a groove bottom apex and a second wall extending from the apex to a second peripheral edge. The second wall has a width greater than a width of the first wall. The method further includes adhering at least one decorative caming strip to the outer surface of the glass panel at locations adjacent and along the first peripheral edge of the at least one groove.

The step of forming a plurality of grooves may include forming a decorative band by forming a pair of opposed, parallel, spaced apart grooves, the pair of spaced apart grooves relatively positioned such that the respective first peripheral walls are disposed adjacent one another and define a platform extending therebetween. The step of adhering at least one caming strip may include adhering the at least one caming strip to the platform such that the caming strip is disposed adjacent, between and along the first peripheral edges of the spaced apart grooves.

The present invention is further directed to a method for forming a decorative glass sheet simulating a multi-pane, camed window or door as described above including forming a plurality of the grooves through the outer surface and into the glass panel such that the grooves intersect one another. The grooves are formed such that the second peripheral edges define and surround a central portion forming a part of the outer surface and the first peripheral edges define a decorative region having substantially the same shape as the central portion. Decorative caming strips are adhered to the outer surface of the glass panel at locations adjacent and along the first peripheral edges of the grooves. After adhering the decorative caming strips, solder may be applied to intersections of respective decorative caming strips which are disposed adjacent intersections of the grooves.

The preceding and further objects of the present invention will be appreciated by those of ordinary skill in the art from a reading of the figures and the detailed description of the preferred embodiment which follow, such description being merely illustrative of the present invention.

DETAILED DESCRIPTION OF THE PREFERRED EMBODIMENTS

Figure 1:
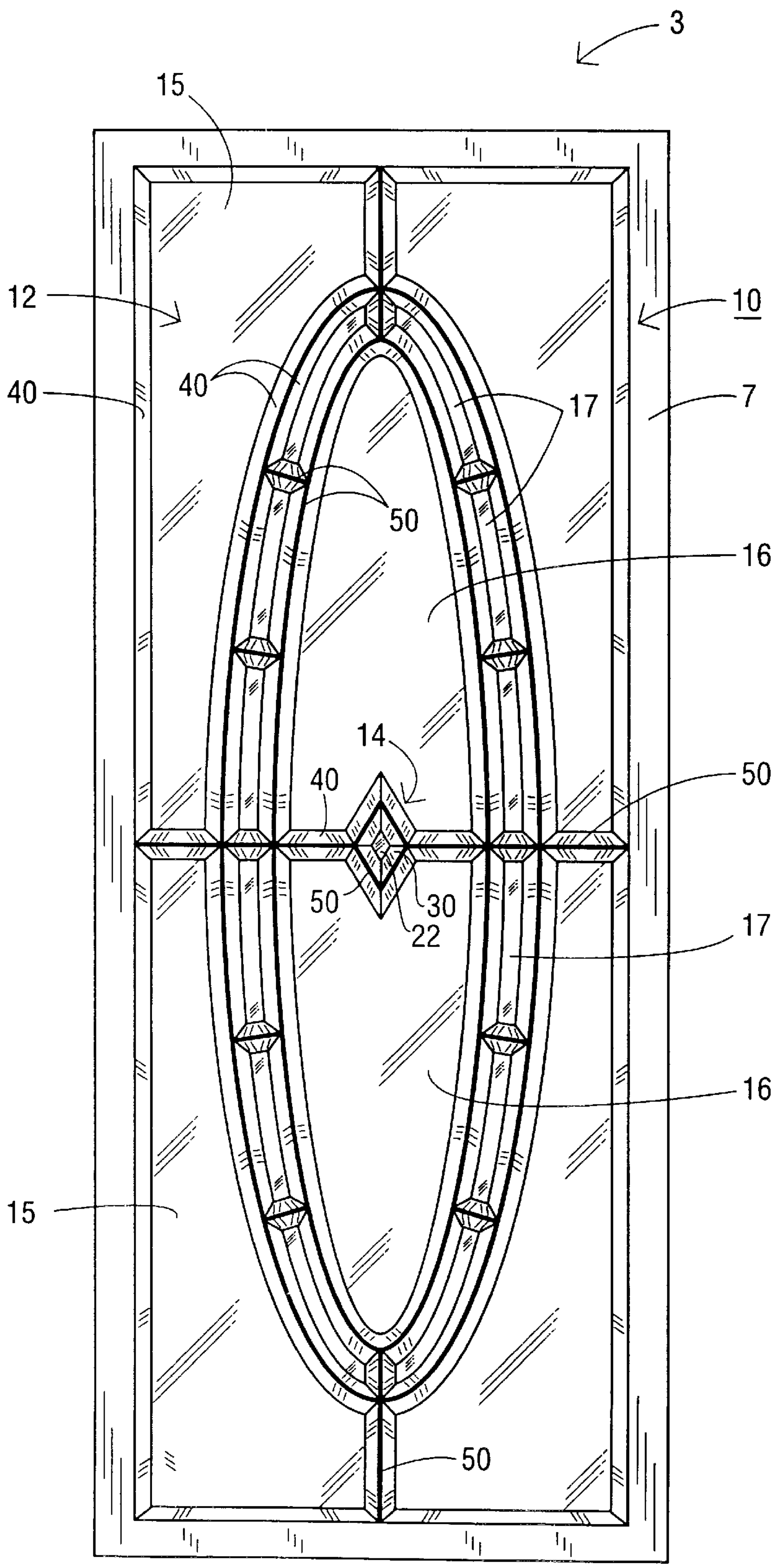
FIG. 1 is a front plan view of a door incorporating a decorative glass sheet according to the present invention.

With reference to FIG. 1, a door 3 incorporating a decorative glass sheet 10 according to the present invention and mounted in a frame 7 is shown therein. For reasons which will be better understood from the description which follows, grooves 30, 40 and caming 50 together give the appearance that decorative glass sheet 10 is formed of a plurality of discrete glass panes joined along their peripheries by caming 50. While the present invention is described in the context of a door 3, it will be appreciated that decorative glass sheets according to the present invention may be incorporated into windows, doorlights, and the like, as well. Moreover, such decorative glass sheets may be incorporated into insulated glass units and various other building articles. Also the decorative glass sheets may be used to form mirrors. Further, it will be appreciated that decorative glass sheets according to the present invention may be formed in designs other than those set forth herein. Caming 50 may be formed of metal (preferably brass), wood, plastic, or other suitable material, depending on the intended application. It will be appreciated from the description which follows that caming strips 50 are not "caming" in the traditional sense of H-shaped metal strips inserted between and physically joining separate glass pieces, but rather are strips of suitable material overlaying and secured to the surface of the glass. As such "simulated caming" and like phrases as used herein are intended to include simulated caming, simulated muntins and similar elements. For example, if wood or plastic caming strips are used, the effect may be to simulate muntins rather than traditional lead caming.

Decorative glass sheet 10 includes unitary glass panel 12. Glass panel 12 has an array of preferably straight walled grooves 30 and 40 formed therein in the pattern as shown. The various grooves 30, 40 define ungrooved portions 15, 16, 17 (collectively, several of ungrooved portions 17 being differently shaped), and 22 of various shapes and sizes. The ungrooved portions are preferably smooth and untreated (i.e., in the same condition as the surface of the stock glass panel). Ungrooved portions 15, 16, 17, 22 may, however, be frosted, etched, tinted, coated (e.g., by screen printing) or similarly treated in whole or in part. A reticulated framework of caming 50 is secured to the glass panel 12 at locations between the respective grooves 30, 40. More particularly, as discussed in greater detail below, the portions of the glass panel 12 to which caming 50 is secured consist of ungrooved portions of the glass surface between the adjacent grooves.

Figure 2:
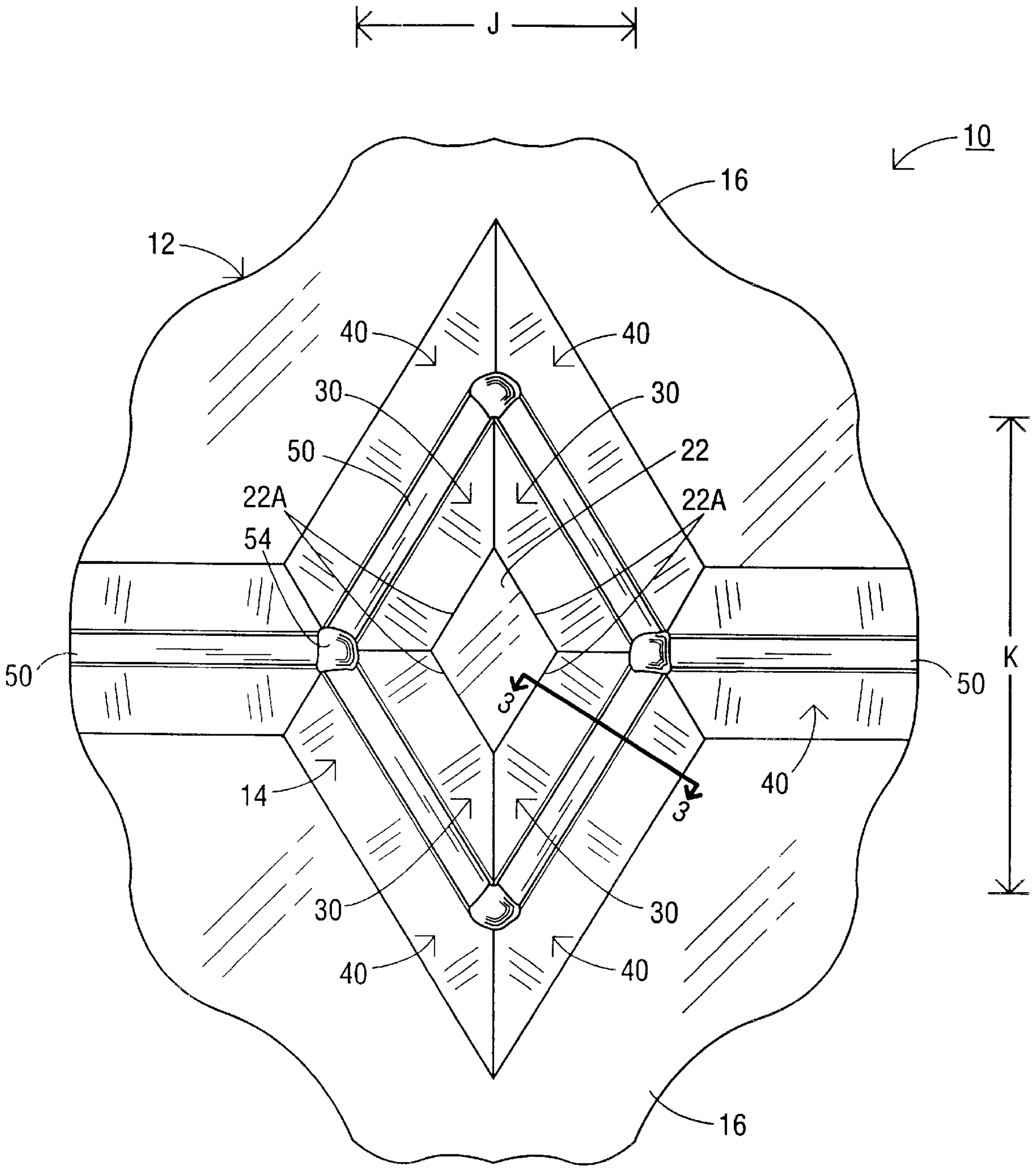
FIG. 2 is a fragmentary, front plan view of a portion of the door of FIG. 1.

Turning to FIG. 2, an enlarged view of the center portion of decorative glass sheet 10 is shown therein. The inner peripheral edges 22A of grooves 30 collectively define upper glass panel surface central portion area 22, the groove sloping downwardly into the glass (i.e. into the paper of FIG. 2) as the groove wall extends from its peripheral edge 22A out toward the adjacent caming strip 50. Solder material 54 is provided at the intersections of respective caming strips 50. Preferably, the caming intersections and the solder are disposed adjacent the intersections of grooves 30 as shown.

Figure 3:
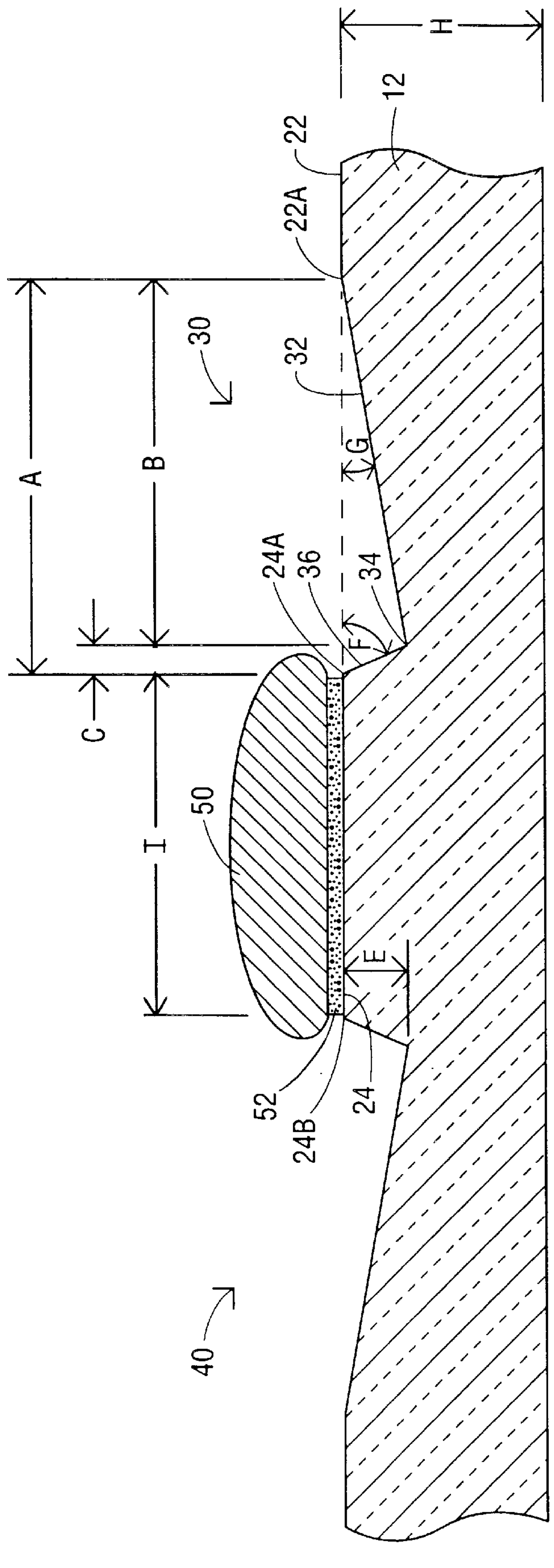
FIG. 3 is a schematic, fragmentary, cross sectional view of the decorative glass sheet taken along the line 3—3 of FIG. 2.

With reference to FIG. 3, a schematic, fragmentary, cross-sectional view along the line 3—3 of FIG. 2 is shown therein. Groove 30 has an overall width A and a vertical depth E. Inner groove wall 32 is defined between inner peripheral edge 22A and groove bottom apex 34, and has horizontal width B. Outer groove wall 36 extends from outer peripheral edge 24A to apex 34, and has horizontal width C.

Outer groove wall 36 forms an angle F with the outer surface of glass panel 12. Inner groove wall 32 forms an angle G with the outer surface of the glass panel. Groove 40 is the mirror image of groove 30, and has outer peripheral edge 24B. Outer surface area or platform 24 extends between the outer peripheral edges 24A and 24B. Outer surface area 24 has a width I. Caming 50 is secured to surface 24 by any suitable means, for example double sided foam tape 52 or adhesive. Glass panel 12 has thickness H. Glass panel 12 is at its full thickness at each of surfaces 22, 24, (and surfaces 15, 16, and 17 as well). Preferably, each of the groove walls are straight walled as shown, and polished.

It has been found that certain parameters should be observed in order to maximize the appearance and simulation effect of the grooves and caming. The overall groove width A should be from about 5 to 30 millimeters, and preferably is from about 10 to 20 millimeters. Width C of the outer groove wall 36 should be no greater than 15 percent of width B of the inner groove wall 32. Angle G should be at least 2 degrees, and is preferably from about 6 to 10 degrees. Angle F should be at least 45 degrees and is preferably from about 45 to 68 degrees. While an angle F of 90 degrees would be optimal, it has been found that with conventional grinding wheels, if angle F exceeds 68 degrees, chipping of the glass occurs along outer peripheral edge 24A. The thickness of glass panel 12 is preferably in the range of from about 3 to 6 millimeters. The depth E of the groove is preferably from about 0.7 to 1.7 millimeters, and should not exceed 35 percent of glass panel thickness H. More preferably, depth E does not exceed 30 percent of thickness H. Width I of platform 24 is preferably from about 5 to 6 millimeters and is preferably about the same as the width of caming strip 50.

The preferred dimensions are also interdependent. Within the above noted ranges and manufacturing limitations, the best simulative effect is achieved by maximizing width B of groove wall 32, maximizing angle F, and maximizing angle G. Each of these dimensions will be limited by thickness H of the glass. The following table sets forth exemplary dimensions or ranges of dimensions for grooves for a glass panel 12 having a thickness H of 3.3 millimeters:

| DIMENSION | A | B | E | F | G |
|---|---|---|---|---|---|
| PREFERRED VALUE | 10 mm (+/− 1 mm) | 9.6 mm (+/− 0.1 mm) | 1 mm (+/− 0.1 mm) | 68° (+/− 1°) | 6° (+/− 0.5°) |

The following table sets forth exemplary dimensions or ranges of dimensions for grooves for a glass panel 12 having a thickness H of 4.0 millimeters:

| DIMENSION | A | B | E | F | G |
|---|---|---|---|---|---|
| PREFERRED VALUE | 10 mm (+/− 1 mm) | 9.47 mm (+/− 0.1 mm) | 1.3 mm (+/− 0.1 mm) | 68° (+/− 1°) | 7.82° (+/− 0.5°) |

The following table sets forth exemplary dimensions or ranges of dimensions for grooves for a glass panel 12 having a thickness H of 5.0 millimeters:

| DIMENSION | A | B | E | F | G |
|---|---|---|---|---|---|
| PREFERRED VALUE | 10 mm (+/− 1 mm) | 9.38 mm (+/− 0.1 mm) | 1.5 mm (+/− 0.1 mm) | 68° (+/− 1°) | 7.08° (+/− 0.5°) |

The following table sets forth exemplary dimensions or ranges of dimensions for grooves for a glass panel 12 having a thickness H of 6.0 millimeters:

| DIMENSION | A | B | E | F | G |
|---|---|---|---|---|---|
| PREFERRED VALUE | 10 mm (+/− 1 mm) | 9.27 mm (+/− 0.1 mm) | 1.8 mm (+/− 0.1 mm) | 68° (+/− 1°) | 11° (+/− 0.5°) |

Notably, the simulated beveled, camed sheet may be formed using relatively thin glass on the order of 3.3 millimeters or ⅛ inch. This is in contrast to prior art methods wherein caming is placed within flat bottom grooves, in which case thicker glass must be used to provide the requisite integrity.

A particularly attractive result is achieved when a decorative region 14 as shown in FIG. 2 is formed. Further, overall width J of region 14 (as defined within the outer edges 24A of grooves 30) is preferably from about 40 to 50 millimeters and the overall length of region 14 (as defined within the peripheral edges 24A of grooves 30) is preferably from about 70 to 80 millimeters.

Means and methods for forming decorative glass sheets according to the present invention will be readily apparent to those of ordinary skill in the art upon a reading of the foregoing and the description which follows. Suitable grooving equipment include a pattern grooving machine available from Intermac of Italy. Grooves 30, 40 may be formed using a commercially available diamond grinding wheel having a shape complimentary to the intended groove. Preferably, the grinding wheel is followed by a polishing wheel. Once the grooves have been formed, it is only necessary to mount the caming strips 50. Notably, no additional step of mounting a separate glass piece is needed.

Figure 4:
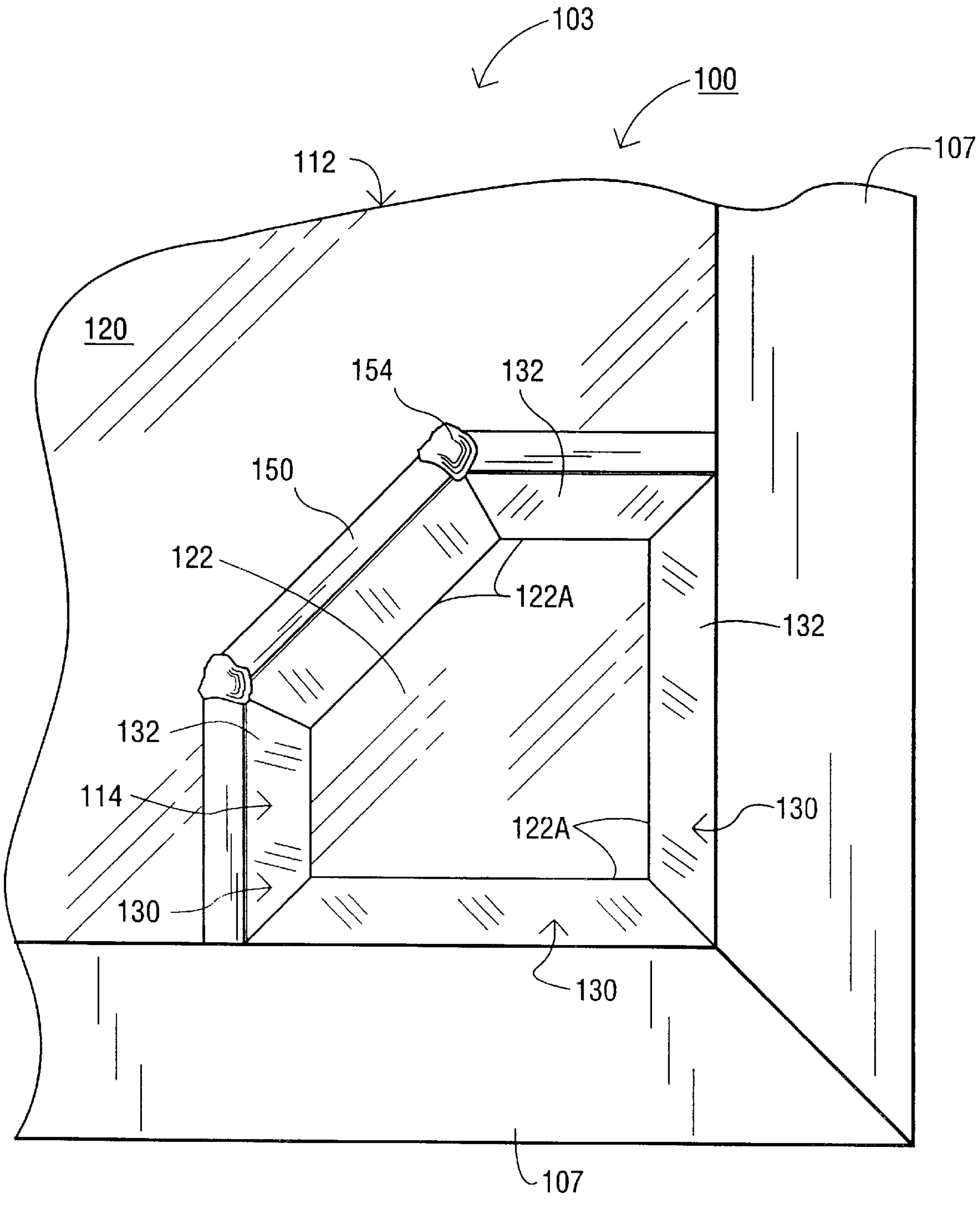
FIG. 4 is a front plan, fragmentary view of a portion of a decorative glass sheet according to a second embodiment of the present invention.

Turning to FIG. 4, a fragmentary view of a door 103 incorporating a decorative glass sheet 100 according to a second embodiment of the present invention and mounted in a door frame 107 is shown therein. While formed in different shapes and configurations, elements 112, 114, 122, 122A, 130, 132, 150, and 154 correspond to elements 12, 14, 22, 22A, 30, 32, 50, and 54 of the first embodiment, respectively. In addition to decorative region 114 being of a different pattern than decorative region 14, glass surface area 120 differs from the glass surface areas 15, 16, 17, and 22 of decorative glass sheet 10 in that it does not have a groove corresponding to grooves 30, 40 immediately adjacent thereto. Rather, caming 150 only has grooves 130 located on the right sides thereof. Under certain circumstances, this configuration may be desirable for aesthetics or cost savings.

Figure 5:
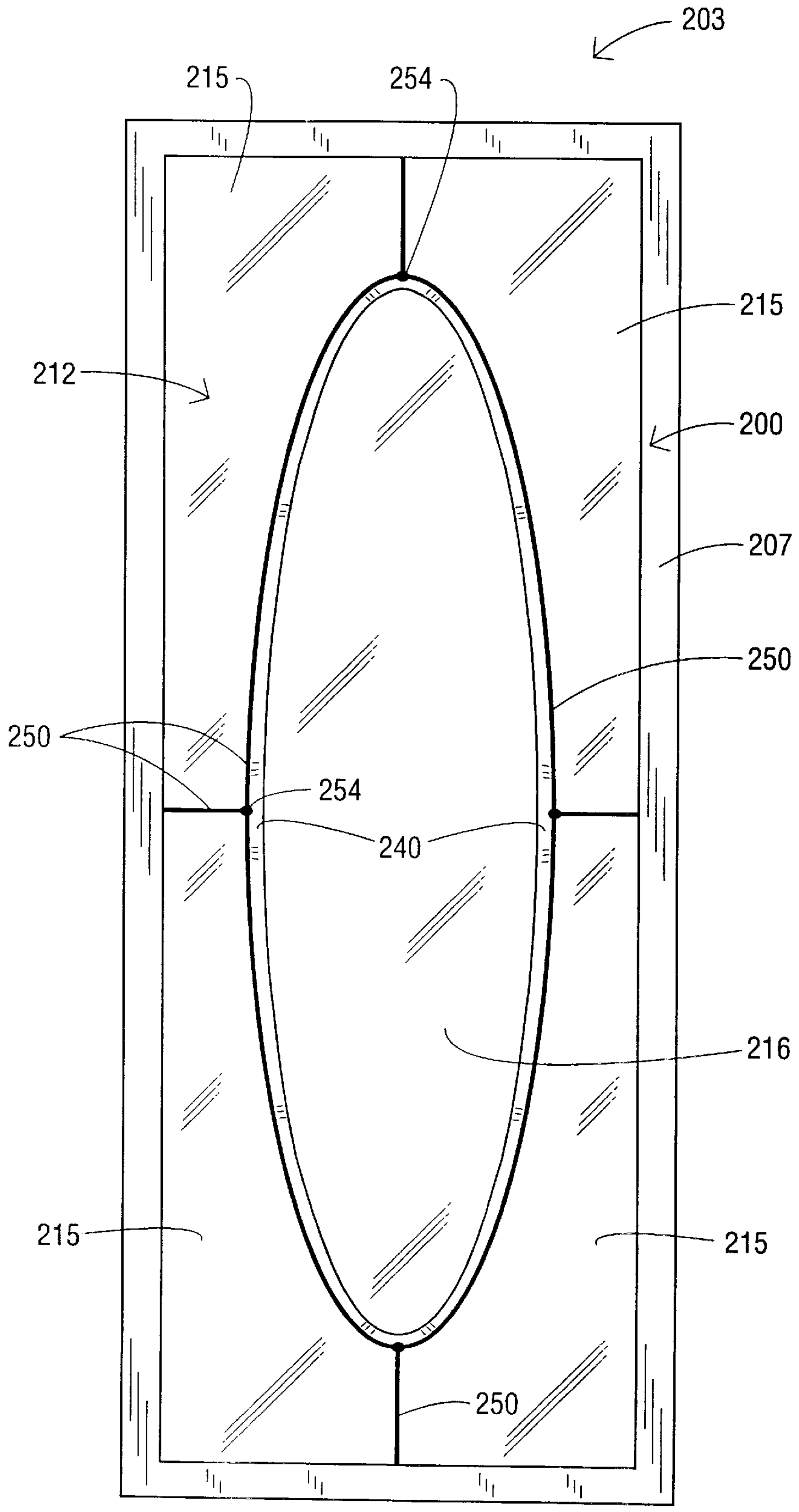
FIG. 5 is a front plan view of a door incorporating a decorative glass sheet according to a third embodiment.

A door 203 incorporating a decorative glass sheet 200 according to a third embodiment mounted in door frame 207 is shown in FIG. 5. While formed in different shapes and configurations, elements 212, 215, 216, 240, 250, and 254 correspond to elements 12, 15, 16, 40, 50 and 54, respectively, of the first embodiment. A continuous elliptical groove 240 is formed only on the interior of caming 250 and surrounds ungrooved portion 216. Ungrooved portions 215 extend up to and beneath caming 250 and the inner edges of door frame 207. While door 203 provides a desirable appearance simulating caming, the costs of manufacturing door 203 are reduced as compared to door 3 because less grooving is required.

Optionally, a second framework of caming strips (not shown) may be secured, preferably in the same manner as caming 50, to the rear surface of the glass sheet. Preferably, the configuration of the second framework matches and is substantially coextensive with the configuration of the caming 50 on the front surface.

While a preferred embodiment of the present invention has been described, it will be appreciated by those of skill in the art that certain modifications may be made without departing from the scope of the present invention. All such modifications are intended to come within the scope of the claims which follow.

What is claimed is:

1. A decorative glass sheet simulating a multi-pane, camed window or door, said decorative glass sheet comprising:

a) a glass panel having an outer surface;

b) a plurality of grooves formed through said outer surface and into said glass panel, said grooves intersecting one another, each said groove including a first wall extending from a first peripheral edge to a groove bottom apex and a second wall extending from said apex to a second peripheral edge, said second wall having a width greater than a width of said first wall; and c) a central portion forming a part of said outer surface and defined by said second peripheral edges of said grooves and surrounded thereby;

d) a decorative region defined by said first peripheral edges of said grooves, said decorative region having substantially the same shape as said central portion; and e) decorative caming strips adhered to said outer surface of said glass panel and disposed adjacent and along said first peripheral edges of said grooves.

2. The decorative glass sheet of claim 1 including a pair of opposed, parallel, spaced apart ones of said grooves defining a platform therebetween, at least one of said caming strips being disposed adjacent, between and along said first peripheral edges of said spaced apart said grooves.

3. The decorative glass sheet of claim 1 wherein said first wall width is no greater than 15 percent of said second wall width.

4. The decorative glass sheet of claim 1 wherein each said second wall forms an angle with said outer surface of said glass panel of at least 2 degrees.

5. The decorative glass sheet of claim 4 wherein each said first wall forms an angle with said outer surface of said glass panel of at least 45 degrees.

6. The decorative glass sheet of claim 1 wherein each said groove has an overall width of from about 5 to 30 millimeters.

7. The decorative glass sheet of claim 6 wherein said overall width of said grooves is from about 10 to 20 millimeters.

8. The decorative glass sheet of claim 1 wherein said central portion is diamond shaped.

9. The decorative glass sheet of claim 1 wherein said decorative region is diamond shaped and has a length no greater than about 80 millimeters and a width no greater than about 50 millimeters.

10. The decorative glass sheet of claim 1 wherein said glass panel has a thickness of from about 3 to 6 millimeters.

11. The decorative glass sheet of claim 10 wherein the depth of said grooves does not exceed 30 percent of the thickness of said glass panel.

12. The decorative glass sheet of claim 1 including solder joining respective said decorative caming strips and disposed adjacent intersections of said grooves.

13. The decorative glass sheet of claim 1 wherein said glass panel includes a second outer surface opposite said first outer surface, said decorative glass sheet including at least one second decorative caming strip secured to said second outer surface.

14. A decorative glass sheet simulating a multi-pane, camed window or door, said decorative glass sheet comprising:

a) a glass panel having an outer surface;

b) at least one groove formed through said outer surface and into said glass panel, each said groove including a first wall extending from a first peripheral edge to a groove bottom apex and a second wall extending from said apex to a second peripheral edge, said second wall having a width greater than a width of said first wall; and c) at least one decorative caming strip adhered to said outer surface of said glass panel and disposed adjacent and along said first peripheral edge of said at least one groove.

15. The decorative glass sheet of claim 14 wherein said first wall width is no greater than 15 percent of said second wall width.

16. The decorative glass sheet of claim 14 wherein each said second wall forms an angle with said outer surface of said glass panel of at least 2 degrees.

17. The decorative glass sheet of claim 16 wherein each said first wall forms an angle with said outer surface of said glass panel of at least 45 degrees.

18. The decorative glass sheet of claim 14 wherein each said groove has an overall width of from about 5 to 30 millimeters.

19. The decorative glass sheet of claim 18 wherein said overall width of said grooves is from about 10 to 20 millimeters.

20. The decorative glass sheet of claim 14 wherein the depth of said groove does not exceed 30 percent of the thickness of said glass panel.

21. The decorative glass sheet of claim 14 wherein said glass panel has a thickness of from about 3 to 6 millimeters.

22. The decorative glass sheet of claim 14 wherein said glass panel includes a second outer surface opposite said first outer surface, said decorative glass sheet including at least one second decorative caming strip secured to said second outer surface.

23. A decorative glass sheet simulating a multi-pane, camed window or door, said decorative glass sheet comprising:

a) a glass panel having an outer surface;

b) a decorative band including at least a pair of opposed, parallel, spaced apart grooves formed through said outer surface and into said glass panel, each said groove including a first wall extending from a first peripheral edge to a groove bottom apex and a second wall extending from said apex to a second peripheral edge, said second wall having a width greater than a width of said first wall, c) said pair of spaced apart grooves relatively positioned such that said first walls of said pair of grooves are spaced from one another and define an outer surface platform extending therebetween; and d) at least one decorative caming strip adhered to said platform and disposed adjacent, between and along said first peripheral edges of said spaced apart grooves.

24. The decorative glass sheet of claim 23 wherein said first wall width is no greater than 15 percent of said second wall width.

25. The decorative glass sheet of claim 23 wherein each said second wall forms an angle with said outer surface of said glass panel of at least 2 degrees.

26. The decorative glass sheet of claim 25 wherein each said first wall forms an angle with said outer surface of said glass panel of at least 45 degrees.

27. The decorative glass sheet of claim 23 wherein each said groove has an overall width of from about 5 to 30 millimeters.

28. The decorative glass sheet of claim 27 wherein said overall width of said grooves is from about 10 to 20 millimeters.

29. The decorative glass sheet of claim 23 wherein said glass panel has a thickness of from about 3 to 6 millimeters.

30. The decorative glass sheet of claim 29 wherein the depth of said grooves does not exceed 30 percent of the thickness of said glass panel.

31. The decorative glass sheet of claim 21 wherein said glass panel includes a second outer surface opposite said first outer surface, said decorative glass sheet including at least one second decorative caming strip secured to said second outer surface.

32. A decorative glass sheet simulating a multi-pane, camed window or door, said decorative glass sheet comprising:

a) a glass panel having an outer surface and a thickness of from about 3 to 6 millimeters;

b) at least a pair of opposed, parallel, spaced apart grooves formed through said outer surface and into said glass panel, each said groove including a first wall extending from a first peripheral edge to a groove bottom apex and a second wall extending from said apex to a second peripheral edge, said second wall having a width greater than a width of said first wall; and c) wherein said first wall width is no greater than 15 percent of said second wall width, said second wall forms an angle with said outer surface of said glass panel of at least 2 degrees, said first wall forms an angle with said outer surface of said glass panel of at least 45 degrees, said overall width of said groove is from about 10 to 20 millimeters, and the depth of said grooves does not exceed 30 percent of said glass thickness;

d) said pair of spaced apart grooves relatively positioned such that said first walls of said pair of grooves are spaced from one another and define a platform extending therebetween; and e) at least one decorative caming strip adhered to said platform and disposed adjacent, between and along said first peripheral edges of said spaced apart grooves.

33. A method for forming a decorative glass sheet simulating a multi-pane, camed window or door, said method comprising the steps of:

a) providing a glass panel having an outer surface;

b) forming a decorative region by forming a plurality of grooves through the outer surface and into the glass panel, the grooves intersecting one another, each groove including a first wall extending from a first peripheral edge to a groove bottom apex and a second wall extending from the apex to a second peripheral edge, the second wall having a width greater than a width of the first wall, the grooves being formed such that the second peripheral edges define and surround a central portion forming a part of the outer surface and the first peripheral edges define a decorative region having substantially the same shape as the central portion; and c) adhering decorative caming strips to the outer surface of the glass panel at locations adjacent and along the first peripheral edges of the grooves.

34. The method of claim 33 including, after adhering the decorative caming strips, the step of applying solder to intersections of respective decorative caming strips which are disposed adjacent intersections of the grooves.

35. A method for forming a decorative glass sheet simulating a multi-pane, camed window or door, said method comprising the steps of:

a) providing a glass panel having an outer surface;

b) forming at least one groove through the outer surface and into the glass panel, each groove including a first wall extending from a first peripheral edge to a groove bottom apex and a second wall extending from the apex to a second peripheral edge, the second wall having a width greater than a width of the first wall; and c) adhering at least one decorative caming strip to the outer surface of the glass panel at locations adjacent and along the first peripheral edge of the at least one groove.

36. The method of claim 35 wherein said step of forming a plurality of grooves includes forming a pair of opposed, parallel, spaced apart grooves, the pair of spaced apart grooves relatively positioned such that the respective first walls of said pair of grooves are spaced from one another with a platform extending therebetween, and wherein said step of adhering at least one caming strip includes adhering the at least one caming strip to the platform such that the caming strip is disposed adjacent, between and along the outer peripheral edges of the spaced apart grooves.

37. A decorative building unit incorporating a glass sheet simulating a multi-pane, camed window or door, said decorative glass sheet comprising:

a) a decorative glass sheet including:

1) a glass panel having an outer surface;

2) at least one groove formed through said outer surface and into said glass panel, each said groove including a first wall extending from a first peripheral edge to a groove bottom apex and a second wall extending from said apex to a second peripheral edge, said second wall having a width greater than a width of said first wall; and 3) at least one decorative caming strip adhered to said outer surface of said glass panel and disposed adjacent and along said first peripheral edge of said at least one groove; and b) a frame member, said decorative glass sheet mounted in and surrounded by said frame member.

38. The decorative building unit of claim 37 wherein said frame member is a door frame.

39. The decorative building unit of claim 37 wherein said frame member is a window frame.

40. The decorative building unit of claim 37 wherein said glass panel includes a second outer surface opposite said first outer surface, said decorative building unit including at least one second decorative caming strip secured to said second outer surface.

* * * * *